United States Patent Office 3,239,506
Patented Mar. 8, 1966

3,239,506
3-AZABICYCLO[3.2.2]NONANE SULFONAMIDE COMPOUNDS
Theodore E. Stanin and Vada L. Brown, Jr., Kingsport, Tenn., assignors to Eastman Kodak Company, Rochester, N.Y., a corporation of New Jersey
No Drawing. Filed Oct. 16, 1964, Ser. No. 404,496
6 Claims. (Cl. 260—239)

This invention relates to 3-azabicyclo[3.2.2]nonane compounds containing a sulfonamide group and to a process for their preparation.

The new 3-azabicyclo[3.2.2]nonane compounds have the formulas:

(I)
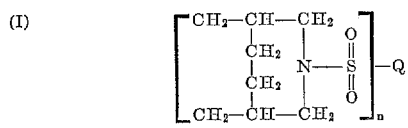

(II)
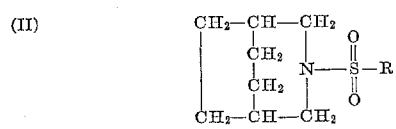

wherein Q represents a monocyclic aryl nucleus of the benzene series, R represents a member selected from the group consisting of an alkyl group, an alkenyl group, a cyclohexyl group, a cyclohexenyl group, a benzyl group, a thienyl group, and a naphthyl group and $n$ represents a member selected from the group consisting of 1, 2 and 3.

The mononuclear aryl nucleus of the benzene series represented by Q may be unsubstituted i.e. phenyl, or substituted. It may be substituted with a halogen atom, such as chlorine, bromine, or fluorine, an alkyl group such as methyl, ethyl, propyl, isopropyl and n-butyl, for example, particularly methyl, an alkenyl group such as vinyl, allyl, methallyl, 1-butenyl, 2-butenyl, 3-butenyl, pentenyl (e.g., 1-pentenyl or 2-pentenyl), for example, an amino group, an alkylamino group such as methylamino, ethylamino, propylamino, isopropylamino or n-butylamino, for example, a dialkylamino group such as dimethylamino, methylethylamino, diethylamino, di-n-propylamino, diisopropylamino, or di-n-butylamino, for example, a hydroxyalkylamino group such as β-hydroxyethylamino, N-methyl-N-β-hydroxyethylamino, N-ethyl-N-β-hydroxyethylamino, β-hydroxypropylamino, γ-hydroxypropylamino or δ-hydroxybutylamino, for example, a cyano group, a carboxyl group, a hydroxy group, an alkacylamido group such as foramido, acetamido or propionamido, for example, a nitro group, a sulfonic acid group, a carbamoyl group, an N-alkylcarbamoyl group such as N-methyl-carbamoyl, N-ethylcarbamoyl, N-n-propylcarbamoyl or N-N-butylcarbamoyl, for example and an N,N-dialkylcarbamoyl group, such as N,N-dimethylcarbamoyl, N-methyl-N-ethylcarbamoyl, N,N-diethylcarbamoyl, N,N-di-n-propylcarbamoyl or N,N-di-n-butylcarbamoyl, for example.

The substituents named hereinbefore are illustrative and not limitative of the substituents that can be present on the phenyl nucleus of the member Q. One, two or three substituents can be present. When the phenyl nucleus is substituted normally only one substituent is present. When more than one substituent is present they can be the same or different. From a practical viewpoint only one of the simpler substituents, amino, NO₂, halogen, alkyl or cyano, for example, is ordinarily present.

The member R of Formula II when alkyl is normally a lower alkyl group having 1 to 4 carbon atoms such as methyl, ethyl, propyl, isopropyl or n-butyl, for example, although it may be a higher alkyl group such as pentyl, hexyl, heptyl, octyl, nonyl or decyl, for example. Vinyl, allyl, methallyl, 1-butenyl, 2-butenyl, 3-butenyl, and pentenyl (e.g. 1-pentenyl and 2-pentenyl) are illustrative of the alkenyl groups R can be.

The new compounds of the invention are readily prepared by reacting 3-azabicyclo[3.2.2]nonane with a suitable sulfonyl chloride compound. Thus, the compounds having the Formula I are prepared by reacting 3-azabicyclo[3.2.2]nonane with a phenylsulfonyl chloride, while the compounds having the Formula II are prepared by reacting 3-azabicyclo[3.2.2]nonane with an alkyl, alkenyl, cyclohexyl, cyclohexenyl, naphthyl or thienyl sulfonyl chloride as the case may be. The sulfonyl chloride compounds employed by use are known compounds. Any that are not specifically disclosed in the prior art can be prepared by the methods used to prepare the known sulfonyl chloride compounds.

3-azabicyclo[3.2.2]nonane is described and claimed in copending Brown, Smith and Stanin U.S. application Serial No. 196,494, filed May 21, 1962, which is a continuation-in-part of their U.S. application Serial No. 82,373, filed January 13, 1961, and now abandoned, which also described and claimed 3-azabicyclo[3.2.2]nonane. The compound is also disclosed in Belgian Patent 608,905 [see Chemical Abstracts, vol. 57, 16561g (1962)].

The following examples illustrate the invention:

EXAMPLE 1

*3-[(p-aminophenyl)sulfonyl]-3-azabicyclo[3.2.2]nonane*

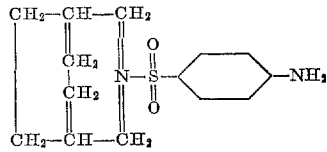

To a one liter three-necked flask equipped with a stirrer, thermometer, and steam bath was added 62.5 grams (0.5 mole calculated as a 100% excess based on the p-formylaminobenzene sulfochloride) of 3-azabicyclo[3.2.2]nonane and 225 ml. of water. To this stirred slurry was added 115.7 grams of a wet paste of freshly prepared p-formylaminobenzene sulfochloride. After the addition of the p-formylaminobenzene sulfochloride had been completed, the reaction mixture was heated with stirring at steam bath temperature for two hours. The reaction mixture was then cooled to 10° C. and the crude solid 3 - [(p - formylaminophenyl)sulfonyl] - 3 - azabicyclo[3.2.2]nonane was collected by filtration.

To a three liter three-necked flask equipped with a stirrer, thermometer and condenser was charged 1250 ml. of 0.5 N methanolic sodium hydroxide, 150 ml. water and the crude 3-[(p - formylaminophenyl)sulfonyl]-3-azabicyclo[3.2.2]nonane. The reaction mixture was stirred and heated under reflux for 1.5 hours, then cooled to 10° C. The solid formed was collected by filtration to yield 28 grams (40% of etheory) of crude 3-](p-aminophenyl) sulfonyl] - 3 - azabicyclo[3.2.2]nonane. Recrystallization from ethyl alcohol-water yielded a product which melted at 150–152° C., uncorr.

ANALYSIS

| Calcd. for: | Percent |
|---|---|
| C | 60.00 |
| H | 7.14 |
| N | 10.00 |
| S | 11.44 |
| Found: | |
| C | 60.01 |
| H | 7.32 |
| N | 10.30 |
| S | 11.04 |

EXAMPLE 2

*3-[(p-aminophenyl)sulfonyl]-3-azabicyclo[3.2.2]nonane*

To a three liter three-neck flask equipped with a stirrer, thermometer, and condenser was charged 30 grams (0.24 mole) of 3-azabicyclo[3.2.2]nonane, 44.3 grams (0.2 mole) of p-nitrobenzenesulfonyl chloride and two liters of water. The pH of the reaction mixture was adjusted to 14 with a 10% solution of sodium hydroxide, then slowly heated to 75° C. The reaction mixture was then cooled to 20° C. and 44 grams (71% of theory) of crude 3-[(p-nitrophenyl)sulfonyl]-3-azabicyclo[3.2.2]nonane was collected by filtration.

The crude 3-[(p-nitrophenyl)sulfonyl]-3-azabicyclo[3.2.2]nonane (44 grams, —0.14 mole), 5 grams of alcohol wet Raney nickel, and 400 ml. methyl alcohol were charged to an autoclave and reduced at 70° C. at 1000 p.s.i. hydrogen pressure until absorption of hydrogen had stopped. The crude reduced product was filtered hot to remove the Raney nickel catalyst. The filtrate was cooled to 20° C. and the solid 3-[(p-aminophenyl)sulfonyl]-3-azabicyclo[3.2.2]nonane was collected by filtration (38.9 grams —98% of theory), melting point 149–151° C., uncorr. Infrared spectra of this material and that obtained in Example 1 were identical.

EXAMPLE 3

*3-(m-nitrophenylsulfonyl)-3-azabicyclo[3.2.2]nonane*

To a 500 ml. three-neck flask equipped with a stirrer, thermometer, and a condenser was added 25 grams (0.2 mole) of 3-azabicyclo[3.2.2]nonane and 200 ml. of pyridine. To this stirred solution was added 44.3 grams (0.2 mole) of m-nitrophenylsulfonyl chloride over an eight-minute period. The reaction mixture was then heated under reflux for 2 hours, then cooled to 10° C. and the solid 3-(m-nitrophenylsulfonyl)-3-azabicyclo[3.2.2]nonane collected by filtration (45 grams, —72.6% of theory). Recrystallization from isopropyl alcohol yielded a product which melted at 169–171° C., uncorr.

ANALYSIS

| Calcd. for: | Percent |
|---|---|
| C | 54.2 |
| H | 5.8 |
| N | 9.03 |
| S | 10.34 |
| Found: | |
| C | 54.12 |
| H | 6.03 |
| N | 8.81 |
| S | 10.07 |

EXAMPLE 4

*3-(m-aminophenylsulfonyl)-3-azabicyclo[3.2.2]nonane*

3-(m-nitrophenylsulfonyl) - 3-azabicyclo[3.2.2]nonane (35 grams, —0.11 mole) was hydrogenated by the method described in Example 2 above to yield 27.9 grams (88% of theory) of 3 - (m-aminophenylsulfonyl)-3-azabicyclo[3.2.2]nonane, M.P. 177–179° C., uncorr.

ANALYSIS

| Calcd. for: | Percent |
|---|---|
| C | 60.00 |
| H | 7.14 |
| N | 10.00 |
| S | 11.44 |
| Found: | |
| C | 60.01 |
| H | 7.47 |
| N | 9.74 |
| S | 11.69 |

EXAMPLE 5

*3-butylsulfonyl-3-azabicyclo[3.2.2]nonane*

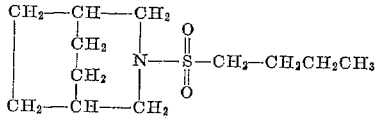

To a 500-ml. three-neck flask equipped with a stirrer, thermometer, condenser, and an addition funnel was added 31.4 grams (0.25 mole) 3-azabicyclo[3.2.2]nonane, 11 grams (0.275 mole) of sodium hydroxide and 150 ml. of water. To this stirred mixture was added 39 grams 0.25 mole) of 1-butanesulfonyl chloride. The temperature of the reaction mixtlre was maintained below 55° C. during the addition of the 1-butanesulfonyl chloride. After the addition had been completed, the reaction mixture was stirred for one hour, then cooled to 10° C. and the 3-butylsulfonyl - 3 - azabicyclo[3.2.2]nonane collected by filtration (52 grams, —84.5% of theory). Recrystallization from ethyl alcohol yielded a product which melted at 56–59° C., uncorr.

ANALYSIS

| Calcd. for: | Percent |
|---|---|
| C | 58.78 |
| H | 9.38 |
| N | 5.71 |
| S | 13.08 |
| Found: | |
| C | 58.9 |
| H | 9.44 |
| N | 5.63 |
| S | 13.25 |

EXAMPLE 6

*3-(3,4-dichlorophenylsulfonyl)-3-azabicyclo[3.2.2]nonane*

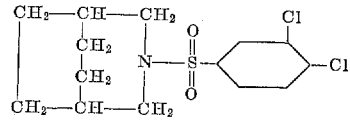

In the manner described in Example 5, 31.4 grams (0.25 mole) of 3-azabicyclo[3.2.2]nonane, 11 grams (0.275 mole) sodium hydroxide, 150 ml. water and 61.4 grams (0.25 mole) of 3,4-dichlorobenzenesulfonyl chloride were reacted to yield 68.3 grams (82% of theory) of 3-(3,4-dichlorophenylsulfonyl) - 3-azabicyclo[3.2.2]nonane. Recrystallization from isopropyl alcohol-water yielded a product which melted at 125–127° C. (form change at 119–124° C.), uncorr.

ANALYSIS

| Calcd. for: | Percent |
|---|---|
| C | 50.46 |
| H | 5.1 |
| N | 4.2 |
| S | 9.62 |
| Cl | 21.01 |
| Found: | |
| C | 50.28 |
| H | 5.13 |
| N | 4.15 |
| S | 9.77 |
| Cl | 21.04 |

EXAMPLE 7

*3-(p-chlorophenylsulfonyl)-3-azabicyclo[3.2.2]nonane*

In the manner described in Example 5, 31.4 grams (0.25 mole) of 3-azabicyclo[3.2.2]nonane, 11 grams (0.275 mole) of sodium hydroxide, 150 ml. of water and 5.28 grams (0.25 mole) of p-chlorobenzenesulfonyl chloride were reacted to yield 47.9 grams (63.9% of theory) of 3-(p-chlorophenylsufonyl)-3-azabicyclo[3.2.2]nonane.

Recrystallization from isopropyl alcohol-water yielded a product which melted at 124–127° C., uncorr.

ANALYSIS

Calcd. for: Percent
C _____ 56.1
H _____ 6.01
N _____ 4.67
S _____ 10.7
Cl _____ 11.84

Found:
C _____ 56.03
H _____ 6.20
N _____ 4.56
S _____ 11.06
Cl _____ 11.72

EXAMPLE 8

3-(methylsulfonyl)-3-azabicyclo[3.2.2]nonane

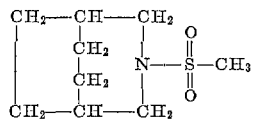

In the manner described in Example 5, 62.8 grams (0.5 mole) of 3-azabicyclo[3.2.2]nonane, 22 grams (0.55 mole) sodium hydroxide, 300 ml. of water and 57.2 grams methylsulfonyl chloride were reacted to yield 46 grams (45.5% of theory) of 3-methylsulfonyl-3-azabicyclo[3.2.2]nonane. Recrystallization from isopropyl alcohol yielded a product which melted at 115–117° C. uncorr.

ANALYSIS

Calcd. for: Percent
C _____ 53.22
H _____ 8.37
N _____ 6.9
S _____ 15.76

Found:
C _____ 53.33
H _____ 8.32
N _____ 6.88
S _____ 15.61

EXAMPLE 9

3-(ethylsulfonyl)-3-azabicyclo[3.2.2]nonane

In the manner described in Example 5, 25 grams (0.2 mole) of 3-azabicyclo[3.2.2]nonane, 8.1 grams (0.202 mole) of sodium hydroxide, 200 ml. water and 25.7 grams (0.2 mole) ethanesulfonyl chloride were reacted to yield 34.2 grams (79% of theory) of 3-ethylsulfonyl)-3-azabicyclo[3.2.2]nonane. Recrystallization from methyl alcohol yielded a product which melted at 63–66° C., uncorr.

ANALYSIS

Calcd. for: Percent
C _____ 55.3
H _____ 8.75
N _____ 6.45
S _____ 14.76

Found:
C _____ 54.93
H _____ 8.72
N _____ 6.20
S _____ 14.91

EXAMPLE 10

3-(2,5-xylylsulfonyl)-3-azabicyclo[3.2.2]nonane

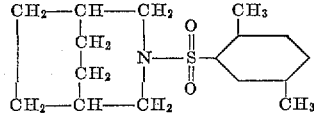

In the manner described in Example 5, 12.5 grams (0.1 mole) of 3-azabicyclo[3.2.2]nonane, 4.1 grams (0.102 mole) of sodium hydroxide, 200 ml. of water and 20.5 grams (0.1 mole) of 2,5-dimethylbenzenesulfonyl chloride were reacted to yield 28.5 grams (97% of theory) of 3-(2,5-xylylsulfonyl)-3-azabicyclo[3.2.2]nonane. Recrystallization from methyl alcohol yielded a product which melted at 117–120° C., uncorr.

ANALYSIS

Calcd. for: Percent
C _____ 65.53
H _____ 7.84
N _____ 4.78
S _____ 10.94

Found:
C _____ 65.70
H _____ 7.98
N _____ 4.70
S _____ 10.97

EXAMPLE 11

3-(2,5-dichlorophenylsulfonyl)-3-azabicyclo[3.2.2]nonane

In the manner described in Example 5, 12.1 grams (0.097 mole) of 3-azabicyclo[3.2.2]nonane, 20 ml. of 20% sodium hydroxide solution, 30 ml. of water and 25 grams (0.101 mole) of 2,5-dichlorobenzenesulfonyl chloride were reacted to yield 3-(2,5-dichlorophenylsulfonyl) 3-azabicyclo[3.2.2]nonane. Recrystallization from dimethylformamide yielded 25.5 grams (76.4% of theory) of pure material, M.P. 149–151° C., uncorr.

ANALYSIS

Calcd. for: Percent
C _____ 51.31
H _____ 5.13
N _____ 4.19
S _____ 9.58
Cl _____ 21.22

Found:
C _____ 50.41
H _____ 5.36
N _____ 3.87
S _____ 5.36
Cl _____ 20.40

EXAMPLE 12

3-(p-fluorophenylsulfonyl)-3-azabicyclo[3.2.2]nonane

In the manner described in Example 5, 12.8 grams (0.102 mole) of 3-azabicyclo[3.2.2]nonane, 30 ml. of 20% sodium hydroxide solution, 30 ml. of water and 25 grams (0.129 mole) p-fluorobenzenesulfonyl chloride were reacted to yield 3-(p-fluorophenylsulfonyl)-3-azabicyclo[3.2.2]nonane. Recrystallization from dimethylfomamide-water yielded 26.5 grams (74.6% of theory) of pure material, M.P. 117–120° C., uncorr.

ANALYSIS

Calcd. for: Percent
C _____ 59.36
H _____ 6.40
N _____ 4.94
S _____ 11.30
F _____ 6.71

Found:
C _____ 57.44
H _____ 6.11
N _____ 5.11
S _____ 11.25
F _____ 6.56

EXAMPLE 13

*3-(2-naphthylsulfonyl)-3-azabicyclo[3.2.2]nonane*

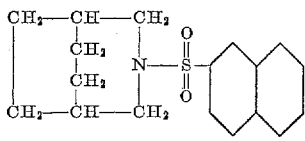

In the manner described in Example 5, 13.1 grams (0.105 mole) of 3-azabicyclo[3.2.2]nonane, 30 ml. of 20% sodium hydroxide solution, 30 ml. of water and 25 grams (0.11 mole) of 2-naphthalenesulfonyl chloride were reacted to yield 3-(2-naphthylsulfonyl)-3-azabicyclo[3.2.2]nonane. Recrystallization from dimethylformamide-water yielded 19.2 grams (58% of theory) of pure material, M.P. 151–153° C., uncorr.

ANALYSIS

Calcd. for: | Percent
--- | ---
C | 68.56
H | 6.70
N | 4.44
S | 10.15

Found:

| | |
--- | ---
C | 68.47
H | 6.68
N | 4.63
S | 10.98

EXAMPLE 14

*3-(2-thienylsulfonyl)-3-azabicyclo[3.2.2]nonane*

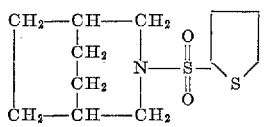

In the manner described in Example 5, 16.3 grams (0.13 mole) of 3-azabicyclo[3.2.2]nonane, 7 grams (0.175 mole) sodium hydroxide, 70 ml. of water and 25 grams (0.136 mole) of 2-thiophenesulfonyl chloride were reacted to yield 3-(2-thienylsulfonyl)-3-azabicyclo[3.2.2]nonane. Recrystallization from methyl alcohol-water yielded 27 grams (79.4% of theory) of pure material, M.P. 119–123° C.

ANALYSIS

Calcd. for: | Percent
--- | ---
C | 53.13
H | 6.32
N | 5.16
S | 23.59

Found:

| | |
--- | ---
C | 53.59
H | 6.44
N | 5.02
S | 22.95

EXAMPLE 15

*3-(p-bromophenylsulfonyl)-3-azabicyclo[3.2.2]nonane*

In the manner described in Example 5, 12.3 grams (0.01 mole) of 3-azabicyclo[3.2.2]nonane, 8 grams (0.2 mole) of sodium hydroxide, 100 ml. of water and 25 grams (0.098 mole) of p-bromobenzenesulfonyl chloride were reacted 3-(p-bromophenylsulfonyl)-3-azabicyclo[3.2.2]nonane. Recrystallization from methyl alcohol yielded 21.9 grams (65.2% of theory) of pure material, M.P. 138–139° C., uncorr.

ANALYSIS

Calcd. for: | Percent
--- | ---
C | 48.85
H | 5.27
N | 4.07
S | 9.30
Br | 23.22

Found:

| | |
--- | ---
C | 49.07
H | 5.25
N | 4.10
Br | 23.85

EXAMPLE 16

*3-(benzylsulfonyl)-3-azabicyclo[3.2.2]nonane*

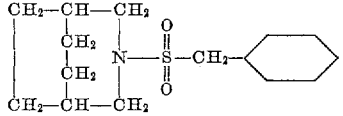

In the manner described in Example 5, 16.4 grams (0.13 mole) of 3-azabicyclo[3.2.2]nonane, 8 grams (0.2 mole) of sodium hydroxide, 80 ml. of water and 25 grams (0.13 mole of α-toluenesulfonyl chloride were reacted to yield 3-(benzylsulfonyl)-3-azabicyclo[3.2.2]nonane. Recrystallization from methyl alcohol yielded 21.1 grams (58% of theory) of pure material, M.P. 139–143° C.

ANALYSIS

Calcd. for: | Percent
--- | ---
C | 64.50
H | 7.58
N | 5.01
S | 11.46

Found:

| | |
--- | ---
C | 64.13
H | 7.45
N | 4.44
S | 11.26

EXAMPLE 17

*1,3,5-tris(3-azabicyclo[3.2.2]non-3-ylsulfonyl)benzene*

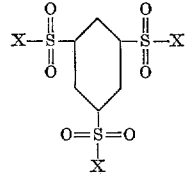

wherein each X stands for a 3-azabicyclo[3.2.2]nonane nucleus joined through the nitrogen atom in its 3-position to the sulfur atom.

In the manner described in Example 5, 25.1 grams (0.2 mole) of 3-azabicyclo[3.2.2]nonane, 8 grams (0.2 mole) of sodium hydroxide, 100 ml. of water and 25 grams (0.067 mole) of 1,3,5-benzenetrisulfonyl chloride were reacted to yield 1,3,5-tris(3-azobicyclo[3.2.2]non-3-ylsulfonyl)benzene. Recrystallization from methyl alcohol yielded 27 grams (63% of theory) of pure material, M.P. >250° C., uncorr. (dec.).

ANALYSIS

Calcd. for: | Percent
--- | ---
C | 56.33
H | 7.09
N | 6.57
S | 15.01

Found:

| | |
--- | ---
C | 55.49
H | 6.98
N | 6.98
S | 15.19

EXAMPLE 18

*3-phenylsulfonyl-3-azabicyclo[3.2.2]nonane*

In the manner described in Example 5, 25 grams (0.2 mole) of 3-azabicyclo[3.2.2]nonane, 8.2 grams (0.205 mole) of sodium hydroxide, 100 ml. of water and 36 grams (0.205 mole) of benzenesulfonyl chloride were reacted to yield 3-phenylsulfonyl-3-azabicyclo[3.2.2]nonane. Recrystallization from ethyl alcohol yielded a pure material (96% of theory), M.P. 96–98° C., uncorr.

ANALYSIS

| Calcd. for: | Percent |
|---|---|
| C | 63.40 |
| H | 7.16 |
| N | 5.32 |
| S | 12.09 |
| Found: | |
| C | 63.04 |
| H | 7.38 |
| N | 5.25 |
| S | 12.51 |

The foregoing examples are illustrative and not limitative of the compounds of the invention. Numerous other compounds of the invention such as 3-(p-methylaminophenylsulfonyl)-3-azabicyclo[3.2.2] nonane,
3-(p-ethylaminophenylsulfonyl)-3-azabicyclo[3.2.2]nonane,
3-(p-butylaminophenylsulfonyl)-3-azabicyclo[3.2.2]nonane,
3-(p-dimethylaminophenylsulfonyl)-3-azabicyclo[3.2.2] nonane,
3-(p-diethylaminophenylsulfonyl)-3-azabicyclo[3.2.2] nonane,
3-(m-carbamoylphenylsulfonyl)-3-azabicyclo[3.2.2]nonane,
3-(p-carbamoylphenylsulfonyl)-3-azabicyclo[3.2.2]nonane,
3-(o-cyanophenylsulfonyl)-3-azabicyclo[3.2.2]nonane,
and 3-(p-cyanophenylsulfonyl)-3-azabicyclo[3.2.2]nonane, for example, can be readily prepared.

The new 3-azabicyclo[3.2.2]nonane compounds of the invention possess varying utility. As illustrated hereinafter, some of the compounds have bacteriostatic activity while others are useful for the preparation of dyes and pigments. Other compounds of the invention are intermediates from which the compounds having bacteriostatic activity or those useful for the preparation of dyes and pigments can be prepared.

EXAMPLE 19

*Preparation of anthraquinone dye*

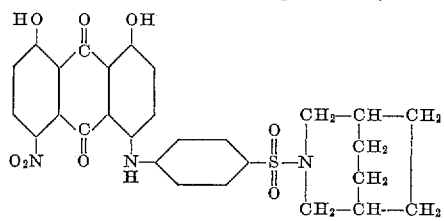

One gram of 4,5-dinitro-1,8-dihydroxyanthraquinone and 2 grams of 3-[p-aminophenylsulfonyl]-3-azabicyclo[3.2.2]nonane and 25 cc. of ethylene glycol were stirred at reflux for 2.5 hours. The mixture was then cooled to room temperature, allowed to stand 2 hours and then filtered. The solid dye obtained was washed on the filter with a little methyl alcohol and then dried. Approximately 2.5 grams of dye were obtained. Dacron and cellulose acetate fibers were dyed purple in an aqueous dispersion of the dye. The dye had good affinity for both kinds of fibers and yielded dyeings thereon having excellent fastness to light.

EXAMPLE 20

*Preparation of a pigment*

A mixture containing 3 grams of 3-nitro-4-chlorobenzenesulfonamide and 2.5 grams of 3-[p-aminophenylsulfonyl]-3-azabicyclo[3.2.2]nonane was heated at 150° C. for about 2 hours. The product formed was recrystallized from 10 cc. of dimethylformamide, washed with methyl alcohol and dried. Three grams of a yellow pigment having the following formula were obtained.

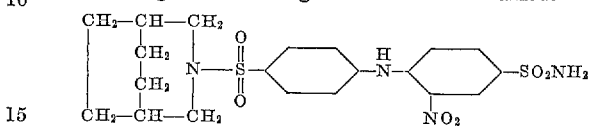

This pigment can be incorporated into polyester melts which can be spun to provide fibers for wash-fast and light-fast yellow fabrics.

PREPARATION OF AZO DYE COMPOUNDS

The 3-azabicyclo[3.2.2]nonane compounds of the invention containing a free amino group can be diazotized and the diazonium compound obtained can be coupled with known coupling components, such as the aniline, phenol, naphthol and pyrazolone type coupling components, for example to obtain azo compounds useful as dyes for textile materials, such as cellulose acetate, cellulose acetate-propionate, polyester materials such as Kodel and Dacron and acrylonitrile polymers such as Verel and Orlon, for example. The utility of the azo dye compounds for these materials is readily determined by testing. Compounds of the invention containing a chloro or a nitro group can be converted to compounds having a free amino group by known techniques.

BACTERIOSTATIC ACTION 3-(p-aminobenzenesulfonyl)-3-azabicyclo[3.2.2]nonane killed *Staphylococcus aureus* at 125 micrograms/cc.
3-methylsulfonyl-3-azabicyclo[3.2.2]nonane killed *Staphylococcus aureus* at 125 micrograms/cc.
3-(p-chlorophenylsulfonyl)-3-azabicyclo[3.2.2]nonane killed *Staphylococcus aureus* at 250 micrograms/cc.
3-(p-nitrophenylsulfonyl)-3-azabicyclo[3.2.2]nonane killed *Staphylococcus aureus* at 125 micrograms/cc.

The invention has been described in detail with particular reference to preferred embodiments thereof, but it will be understood that variations and modifications can be effected within the spirit and scope of the invention as described hereinbefore and as defined in the appended claims.

We claim:

1. The compound 3-[(p-aminophenyl)sulfonyl]-3-azabicyclo[3.2.2]nonane having the formula:

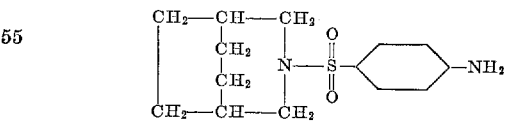

2. The compound 3-[(m-aminophenyl)sulfonyl]-3-azabicyclo[3.2.2]nonane having the formula:

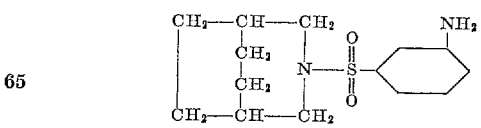

3. The compound 3-[(p-chlorophenyl)sulfonyl]-3-azabicyclo[3.2.2]nonane having the formula:

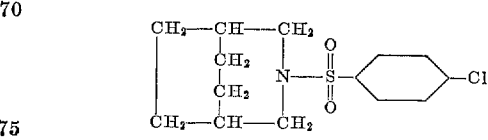

4. The compound 3-(methylsulfonyl)-3-azabicyclo[3.2.2]nonane having the formula:

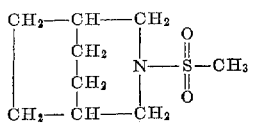

5. A compound having the formula:

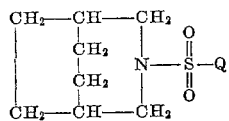

or the formula:

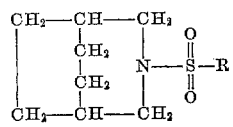

wherein Q is:
(a) aminophenyl,
(b) halophenyl, or
(c) nitrophenyl, and wherein R is lower alkyl.

6. The compound 3-(p-nitrophenylsulfonyl)-3-azabicyclo[3.2.2]nonane having the formula:

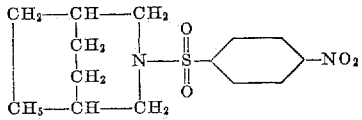

No references cited.

NICHOLAS S. RIZZO, *Primary Examiner.*
ALTON D. ROLLINS, *Assistant Examiner.*

UNITED STATES PATENT OFFICE
CERTIFICATE OF CORRECTION

Patent No. 3,239,506                                March 8, 1966

Theodore E. Stanin et al.

It is hereby certified that error appears in the above numbered patent requiring correction and that the said Letters Patent should read as corrected below.

Column 1, lines 15 to 20, the formula should appear as shown below instead of as in the patent:

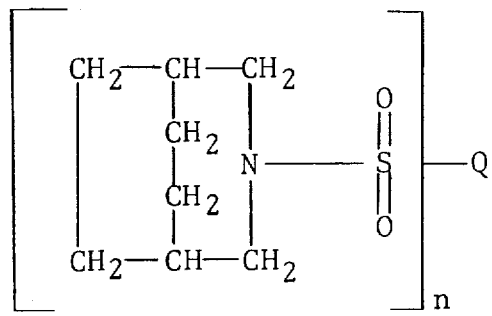

column 2, lines 31 to 37, the formula should appear as shown below instead of as in the patent:

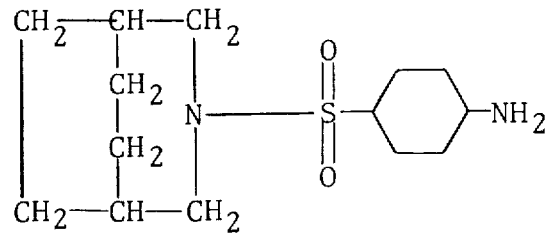

Signed and sealed this 19th day of September 1967.

(SEAL)
Attest:

ERNEST W. SWIDER                               EDWARD J. BRENNER
Attesting Officer                              Commissioner of Patents